United States Patent Office
3,429,353
Patented Feb. 25, 1969

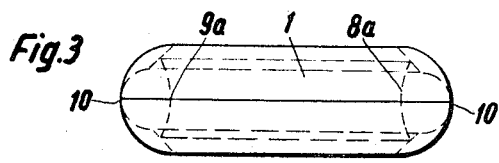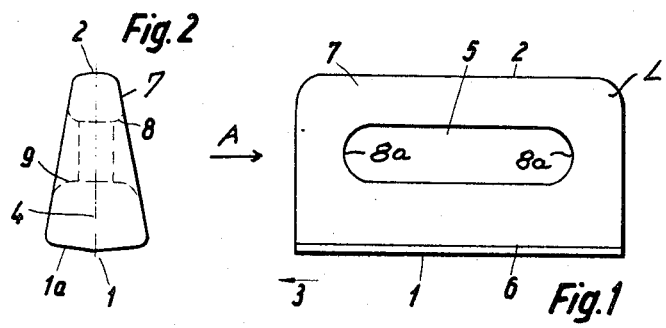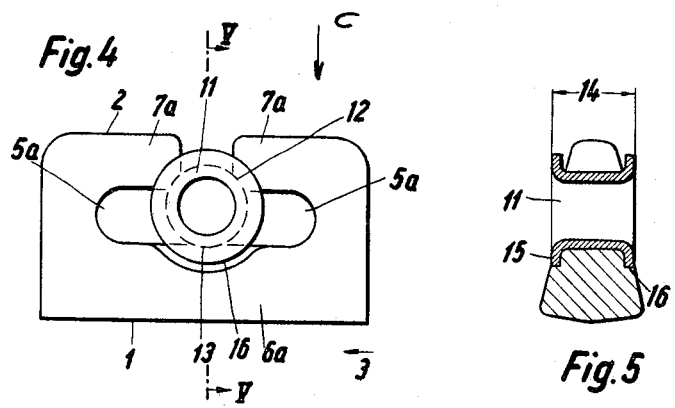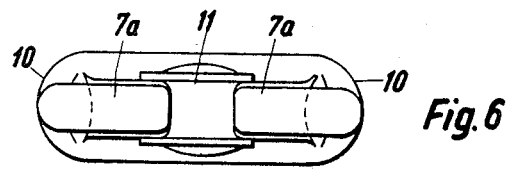

3,429,353
CHAIN LINK FOR ANTI-SKID AND TIRE-PROTECTIVE CHAINS
Werner Schürle, Aalen, Anton Müller, Unterkochen, and Günter Witzel, Aalen, Germany, assignors to Eisen- und Drahtwerk Erlau A.G., Aalen, Wurttemberg, Germany
Filed July 5, 1966, Ser. No. 562,783
Claims priority, application Germany, July 5, 1965, E 29,642; May 14, 1966, E 23,447
U.S. Cl. 152—243    14 Claims
Int. Cl. B60c 27/00; F16g 15/12

ABSTRACT OF THE DISCLOSURE

A chain link for anti-skid tire chains in the form of an elongated plate having aperture means therein which is of such a structural character that natural wear during the use of the chain link will only slightly affect the functionality of the link.

---

The present invention relates to a chain link for anti-skid and tire-protective chains, and in particular concerns a web member with at least one chain link opening for receiving further chain links, said web member being at one side provided with a tire-engaging surface and on the opposite side with a ground-contacting surface.

Heretofore, chain links of the above mentioned general type have the same thickness throughout their entire cross section. These chain links can under particularly hard conditions especially within the range of their ground-contacting surface wear relatively fast so that their strength is affected and they eventually get detached when the link has worn through to the chain opening.

Attempts have been made by reinforcing the entire cross section of the chain link to increase its wear resistance. Since, however, such reinforcement also increases the weight of the link, such reinforced chain links are suitable only to a limited extent for their employment in anti-skid and tire-protective chains.

The heretofore known web members of link chains have the further drawback that relatively sharp merging areas are provided between the short sides of the chain link and the long web sides thereof. This is the reason why chain links of this type have the tendency to jam or get stuck within the chain. This danger prevails in particular when mounting the chain on the tire or during operation of the already mounted chain in that range of the chain which when looking in the driving direction of the tire is located in front of that tire portion which closely precedes the tire-ground contact area where the chain is only loosely guided and hits the ground in this condition. If a jamming of the web link in an annular link occurs, it can lead to a bursting of the annular or ring link. Inasmuch as for the two ring links in the web link only one common chain link opening is provided which is designed as an oblong hole, the ring links may during jamming of the web link damage each other and bring about a widening of the chain link opening. Under extreme conditions the link may right itself up which in turn will result in a tearing of the web link.

It is, therefore, an object of the present invention to provide a chain link of the above mentioned general type which will assure a long life.

It is another object of this invention to provide a chain link of the above mentioned general character in which the natural wear during the use of the chain link will only slightly affect the functionality of the chain link.

It is a still further object of this invention to provide a chain link as set forth above which will be of relatively light weight while still having a high strength and being greatly resistant against pull, bending and pressure stresses.

It is also an object of this invention so to design a web link that the danger of jamming in the chain will be nearly eliminated.

It is also an object of this invention to provide a web link which will not be damaged if a jamming of the chain links should occur.

These and other objects and advantages of the invention will appear more clearly from the following specification in connection with the accompanying drawings, in which:

FIG. 1 is a side view of a chain link according to the present invention.

FIG. 2 shows the chain link of FIG. 1 as seen in the direction of the arrow A of FIG. 1.

FIG. 3 is a bottom view of the link of FIG. 1.

FIG. 4 represents a modification of a chain link illustrated in FIG. 1.

FIG. 5 is a section along the line V—V of FIG. 4.

FIG. 6 is a top view of the chain link of FIG. 4 as seen in the direction of the arrow C.

Figure 7:
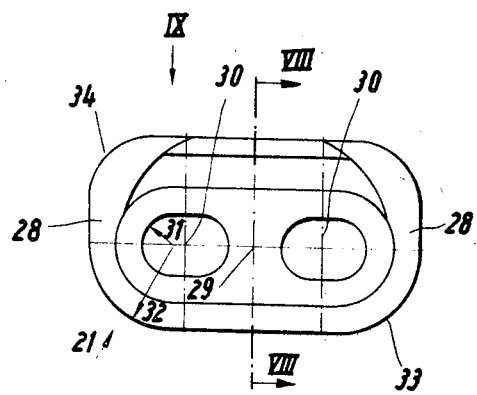
FIG. 7 represents a further modification of a chain link according to the invention and, more specifically, shows a side view of a chain link with upwardly directed ground contact surface.

A chain link according to the present invention which has a tire-engaging surface and an oppositely located ground-contacting surface, is characterized primarily in that the chain link decreases in cross section from the ground-contacting surface at least to the central portion of the link. In this way, the area of the chain link which is exposed to the greatest wear, namely the ground-contacting area, is reinforced, whereas the web link due to its relatively weak cross section in the central area will not have an undue weight. In view of the large wearing surfaces and the wearing volume of the chain link within the range of the ground-contacting surface, the chain link will be fully operable even after longer periods of use.

Referring now to the drawings in detail and FIGS. 1 to 3 thereof in particular, these figures illustrate a chain link L in the form of a web link which has a ground-contacting surface 1 having approximately twice the width of the tire-contacting surface 2. The difference in the width of the surfaces 1 and 2 is obtained by the fact that the chain link has a trapezoidal cross section.

The ground-contacting surface 1 is composed of two surfaces 1a which extend in the longitudinal direction of link L and form an angle with each other so that the surfaces 1a intersect each other approximately in the longitudinal central plane 4 of the chain link. The said surfaces 1a flare upwardly with regard to each other.

Chain link L is provided with an oblong hole 5 extending in the longitudinal direction of the link and adapted to receive further chain links. Oblong hole 5 is so arranged that web 6 which forms the ground-contacting surface 1 has a height greater than the height of web 7 which comprises the tire-engaging surface 2. The edges 8, 9 of the oblong hole 5 are rounded over a quarter of a circle so that additional chain links suspended in link L can easily tilt or turn relative to each other. The edges 8a and 9a are preferably rounded so as to extend over half a circle.

As will be seen from FIG. 3, the front and rear end faces 10 of the chain link are rounded along a semi-circle, whereby the chain link, also within the range of its end faces 10 will be subjected to a relatively minor wear.

The tire-contacting surface 2 of the chain link is crowned whereby a tire equipped with a chain comprising chain links according to the invention will be protected against wear to a considerable extent.

Referring now to the embodiment of FIGS. 4 to 6, it will be noted that the chain link web portion which comprises the tire-engaging surface 2 has a cutout in the central area thereof so that two legs 7a are formed which extend toward each other with the inner ends thereof spaced from each other. Between the two legs 7a and also between the latter and the web portion comprising the ground-contacting surface 1 there is clamped-in a hollow rivet 11 the axis of which is transverse to the longitudinal direction (indicated by the arrow 3) of the chain link. The said hollow rivet 11 divides the oblong hole of the chain link into two individual recesses 5a separated from each other. The individual legs 7a, by means of corresponding semi-circular surfaces 12 within the area of the top side of the hollow rivet 11 rest on the latter, whereas at the lower web portion 6a of the chain link there is provided a corresponding semi-circular recess 13 in which the lower area of the hollow rivet 11 is located. Thus, by means of said rivet 11, the individual legs 7a are supported relative to web 6a in such a way that the chain link will be characterized by high elasticity and high strength properties.

The length 14 of hollow rivet 11 is less than the width of the ground-contacting surface 1 so that the folded-over rivet portions 15 of the hollow rivet 11 cannot be damaged when the chain link is mounted. Furthermore, the two folded-over rivet portions 15 of the hollow rivet 11 have their lower area located in corresponding lateral recesses 16 of the lower web portion 6a. Hollow rivet 11 can be knocked out if it should be so desired and can be replaced by a new hollow rivet so that the chain link according to FIGS. 4 to 6 is suitable for repair of anti-skid and tire-protective chains on the spot.

Figure 8:
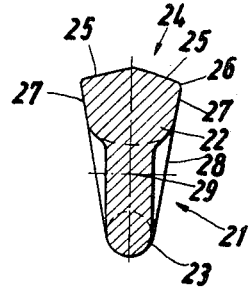
FIG. 8 is a section along the line VIII—VIII of FIG. 7.
Figure 9:
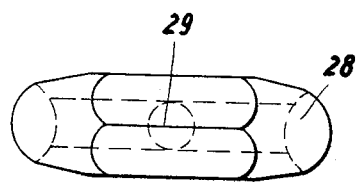
FIG. 9 is a view as seen in the direction of the arrow IX of FIG. 7.

The modification of the present invention as illustrated in FIGS. 7 to 9 likewise has a rectangular shape while the corners are rounded to a considerable extent. The ground-contacting web portion 22 is considerably wider than the tire-contacting web portion 23 so that a considerable wear volume is obtained. The ground-engaging surface 24 of web 23 is formed by two sections 25 which are inclined toward each other in a roof-shaped manner. The said sections 25 merge with the side walls 27 through rounded portions 26, said side walls 27 tapering toward the tire-contacting web portion 23. The inclination of the side walls 27 with regard to each other corresponds to the inclination of the side walls of the short sides 28 of the chain link which establish the connection between the ground-contacting web portion 22 and the tire-contacting web portion 23. Centrally located between the short sides 28 of the chain link there is provided a central web 29 which separates from each other the two oblong chain link openings 30 adapted to receive further chain links therein.

The chain link openings 30 have rounded semi-circular ends. The radii of curvature 31 of those ends of the chain link openings 30 which face the short sides 28 have the same center as the radii of curvature for the merging portions 33 from the tire-contacting web portion 23 with the short sides 28. The radii of curvature 32 for the merging section 33 are greater than the radii of curvature (not shown) for the merging section 34 from the short sides 28 to the ground-contacting web portion 22.

As will be evident from FIGS. 7 to 9, the short sides 28 of the chain link 21 have an approximately elliptical cross section. The central web 29 has a circular cross section and has the same diameter as the tire-contacting web portion 23. As a result thereof, that range of link chain 21 in which the chain link openings 30 are located are offset relative to the sides 28 and the ground-contacting web portion 22 in the direction toward the tire-contacting area. All corners and edges of the chain link 21 are as shown in the drawing well rounded so that an appealing smooth and easily produceable chain link is obtained which with a minimum of material will yield a maximum of wear resistance.

In view of the considerable rounding of the corner portions of the chain link, a hooking or jamming with other chain links in the chain structure will be prevented for all practical purposes, particularly inasmuch as the suspended non-illustrated chain links will be able to a limited extent only to displace themselves with regard to the chain link 21, in view of the fact that the suspended non-illustrated chain links are held in two separate chain link openings 30. Consequently, the movability of said suspended non-illustrated chain links will be limited to a desired extent without affecting the good flexibility of the chain.

Figure 10:
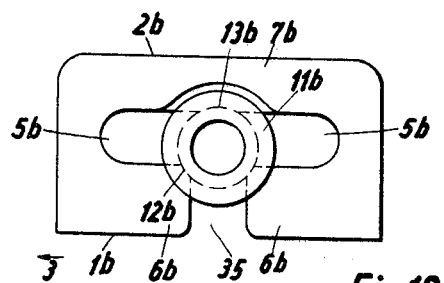
FIG. 10 is still another modification of a chain link according to the invention.

The embodiment of the invention illustrated in FIG. 10 differs from that of FIGS. 4 to 6 primarily in that the ground-contacting surface 1b containing the web portion of the chain link is by means of a recess 35 sub-divided in the longitudinally central portion, whereas the web portion 7b which contains the tire-contacting surface 2b forms a non-divided continuous web. In view of the recess 35, two individual webs 6b are formed which comprise the ground engaging surface 1b and which are spaced from each other. Between the two individual legs 6b and between the latter and web 7b comprising the tire-engaging surface 2b there is clamped-in a hollow rivet 11b the axis of which extends in a direction transverse to the longitudinal direction (indicated by the arrow 3) of the chain link. The said hollow rivet 11b sub-divides the oblong hole of the chain link into two separate individual openings 5b. The individual legs 6b rest by means of corresponding semi-circular surfaces 12b within the range of the lower side of the hollow rivet 11b on the latter, whereas the other web 7b of the chain link has a corresponding semi-circular recess 13b in which the upper section of the hollow rivet 11b is located. It will be appreciated that the individual legs 6b are supported relative to web 7b so that the chain link will have a high elasticity and also a high wear resistance.

Figure 11:
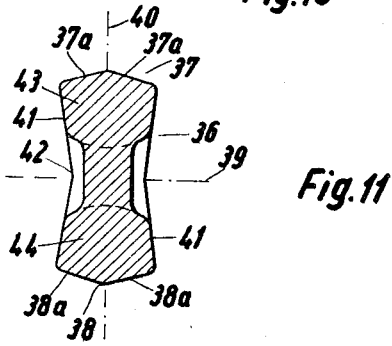
FIG. 11 is a transverse section through a double trapezoidal chain link.

FIG. 11 shows that the chain link 36 may also have a substantially double trapezoidal cross section. Advantageously, those portions of chain link 36 which are located on opposite sides of the transverse central plane 39 are advantageously designed symmetric to each other. The contacting surfaces 37, 38 are formed by two individual surfaces 37a, 38a respectively, and these surfaces form flat angles with each other similar to the arrangement shown in FIGS. 1 to 3. Also, the chain link 36 is symmetric with regard to the longitudinal central plane 40 which is approximately perpendicular to the contacting surfaces 38, 37. The lateral surfaces 41 of the chain link 36 converge from the contacting surfaces 37, 38 toward the central transverse plane 39 so that the chain link 37 will have its narrowest cross section within its central area 42. It will thus be obvious that when the chain link is worn from the ground-contacting surface on, the width of this ground-contacting surface will with increasing wear decrease only slightly so that there will always remain a relatively large wear-resistant surface. The chain link according to FIG. 11 may be provided with an oblong hole extending all the way through in conformity with FIGS. 1 to 3 but may also be provided with two separate oblong holes as shown in FIGS. 7 to 9. Furthermore, one of the two webs 43, 44 which comprise the contacting surface 37, 38 may in conformity with the embodiments of FIGS. 4 and 10 be separated from each other by a cutout in which instance, advantageously, the individual legs separated from each other by said cutout are supported by a hollow rivet or the like.

The advantages of the present invention may furthermore be summarized as follows:

Due to the fact that the ground-contacting surface is formed by two individual surfaces forming a flat angle with each other, the ground-contacting surface is larger than if it were entirely plane. Moreover, the said two-surface design of the ground-contacting area simplifies the production of the chain link, for instance, as a drop forged workpiece.

The trapezoidal cross-sectional shape of the chain link at least up to the central portion between the contacting surfaces imparts high strength properties upon the chain link.

The provision of two chain link openings in the chain link limits the displacement of the annular links received therein and thus prevents a jamming when said annular links tilt. Also an uprighting of the web member will be prevented.

In case of providing a single oblong hole in the chain link while the edges of said oblong hole are formed by a quarter of a circle, a good articulation of the chain links will be assured, and when the front and rear end face of the chain link is rounded preferably by a semicircle, the danger of jamming of individual chain links is further reduced.

By providing a cutout in one web portion at one side of the chain-receiving hole, it is possible later to introduce further chain links into the link member as it may be necessary for instance for purposes of repair. By the provision of the insert member for instance in the form of rivet 11, 11b which sub-divides the oblong hole into two individual holes, the movability of additional chain links introduced into the respective link will be limited within each individual hole. At the same time, the said insert member forms a support of the continuous web length with regard to the separated web lengths.

By folding the hollow rivet 11 at its marginal portion in the manner shown in FIG. 5, the hollow rivet will not protrude beyond the chain link and thus cannot be damaged when the chain link is in operation. An undesired detachment of chain links inserted into the link shown in the drawing will be made impossible by the hollow rivet.

Advantageously, the web link is at least within the area of the ground-contacting surface surface-hardened so that a large hardened wear-resistant surface is obtained. In view of the lower specific surface pressure acting upon the ground-contacting surface, a reduced wear is obtained, while the increased volume of material with the web link according to the invention further contributes to a reduction in the wear.

In particular instances, especially when the chain is not subjected to too great a wear, it is advantageous to design the ground-contacting surface approximately twice as wide as the tire-contacting surface in which instance the chain link advantageously has a cross section which in its entirety is trapezoidal. To make the tire-contacting surface of the web link crown-shaped will reduce the wear of the tire equipped with the tire-protecting chain.

By rounding the merging portions between the individual sides of the web member and by rounding the individual sides of the web member itself, a jamming of the web member will be prevented for all practical purposes.

As mentioned above, in order to assure the movability of the annular links in the web link as it is necessary for the flexibility of the chain, the oblong chain link opening can be provided with arched, especially semi-circular ends. The radii of curvature of that end of each chain link opening which is adjacent to the short side of the chain link and the radii of the circumferential portion forming the merging part between the tire-facing web portion and the corresponding short side have advantageously the same center so that in spite of the large rounding at the tire adjacent corners of the web member, no undesired weakening will occur in this area.

By so designing the central web portion and the tire-contacting web portion of the chain link that they have approximately circular cross section within the area of the chain link openings, both parts will have approximately the same thickness with the result that a good support of the ground-contacting web in the central area thereof is obtained and that the ground-contacting web portion can be worn off to a considerable extent without the danger that a break occurs.

As has also been stated above, the short sides of the chain link may form a conically broadening merging portion from the narrower tire-engaging web portion to the wider ground-engaging web portion. Inasmuch as the short sides have an approximately elliptical cross section, within the range of the short sides and their merging areas to the web portions of the chain link, no edge will be formed which could permit a hooking of the chain link. That side of the ground-contacting web portion which confines the chain link opening may be slightly arched so that all merging portions between adjacent areas will be rounded. The side walls of the ground-contacting web have the same inclination as the respectively adjacent conically widening short sides of the chain link and are respectively located therewith in the same plane.

By making the tire-contacting surface and the ground-contacting surface of the web link according to the invention of the same width, preferably of identical design, it is possible after one side of the web link has been worn to reverse the web link and use it again. An anti-skid and tire-protective chain of this type is also suitable for sensitive tires and low pressure tires because the chain links rest on the tire by means of a relatively large surface.

By designing the chain links symmetric with regard to the central plane between the engaging surfaces, the chain link can be produced in a very simple manner and can easily be mounted. Advantageously, the chain link is of a double trapezoidal cross section while the side surfaces of both engaging surfaces converge to the central plane therebetween.

Finally, reference may be had once more to the feature that that web portion which comprises the ground-contacting surface and is located at one side of the chain link opening is interrupted preferably in the longitudinal central area by a cutout for introducing a further chain link. The thus cantilever-like formed individual web portions which can be supported by an insert member will due to the fact that they are supported at the ground be pressed to the chain link opening so that an accidental opening of this chain link will be prevented.

What we claim is:

1. A chain link for anti-skid tire chains, said link being in the form of an elongated plate having aperture means therein for connection of the link to other links, said link having a first tire engaging surface on one side and a second road engaging surface on the opposite side and lateral surfaces on the lateral sides of the link connecting said engaging surfaces, said engaging surfaces extending in substantially parallel longitudinal directions and each being substantially uniform in which from end to end, and said link comprising a longitudinally extending intermediate region between said engaging surfaces and narrower in the lateral direction than either thereof; said intermediate region also being of substantially uniform width from end to end, said link also having ends with end surfaces extending between said engaging surfaces and said lateral surfaces.

2. A chain link according to claim 1 in which said lateral surfaces incline toward each other from each engaging surface to said intermediate region.

3. A chain link according to claim 2 in which each portion of each lateral surface between a said engaging surface and said intermediate region is substantially planar.

4. A chain link according to claim 1 in which both of said engaging surfaces are of the same width and length.

5. A chain link according to claim 4 in which said intermediate region is disposed in a plane located midway between said engaging surfaces and the said link is symmetrical with respect to said plane.

6. A chain link according to claim 5 in which said link on each side of said plane is substantially trapezoidal.

7. A chain link according to claim 5 in which each engaging surface is made up of two individual surfaces at an angle to each other and intersecting in the central longitudinal plane of the link, said angle being such that said individual surfaces diverge toward the link.

8. A chain link according to claim 1 in which said aperture means comprises two oblong openings.

9. A chain link according to claim 1 in which said aperture means comprises one oblong opening.

10. A chain link according to claim 9, in which said link has a cutout extending from one of said engaging surfaces to said opening to thereby divide said link on one side of said opening into two cantilever-like arms having their free ends in spaced relationship to each other, and a substantially cylindrical insert member inserted in said opening and clamped between said two arms and the opposite side of said opening.

11. A chain link according to claim 10, in which said insert member is formed by a hollow rivet extending in a direction transverse to the longitudinal direction of said link and having its end portions folded over radially outwardly, said lateral sides of the link being provided within its lateral recesses for receiving the folded over portions of said hollow rivet, the length of said hollow rivet in riveted position of the latter being less than the width of the engaging surfaces of the link.

12. A chain link according to claim 1, in which the merging portion between the first and second surfaces and the end surfaces of said chain link is considerably rounded in such a way that the radii of curvature from the end surfaces of the chain link to said second surface are greater than the radii of curvature from said first surface to said end surfaces of said chain link.

13. A chain link according to claim 8, in which each of said two oblong openings has its two end faces rounded to approximately semi-circular shape, said first and second surfaces being connected to the end surfaces of said link by curved surface sections the center of curvature of which coincides with the center of curvature of the outer end faces of said two openings.

14. A chain link according to claim 13, in which that portion of the link which is located between said two openings approximately equals in thickness the distance between said second surface and the respective adjacent inner surface of the respective adjacent opening, the end surfaces of said chain link flaring toward the later surfaces of said link so as to confine therewith an approximately elliptical contour.

References Cited

UNITED STATES PATENTS

| | | | |
|---|---|---|---|
| 1,875,268 | 8/1932 | Senglar | 152—243 |
| 2,507,025 | 5/1950 | Lemmon | 59—90 X |

ARTHUR LA POINT, *Primary Examiner.*

CHARLES B. LYON, *Assistant Examiner.*

U.S. Cl. X.R.

59—84